United States Patent [19]

Anselmo

[11] Patent Number: 5,791,235
[45] Date of Patent: Aug. 11, 1998

[54] DEVICE FOR ROASTING POULTRY

[76] Inventor: Anthony Gray Anselmo, 177 Main St., Harwich, Mass. 02645

[21] Appl. No.: 966,674

[22] Filed: Nov. 10, 1997

Related U.S. Application Data

[63] Continuation of Ser. No. 807,333, Feb. 28, 1997, abandoned.

[51] Int. Cl.⁶ .............. A47J 37/04; A47J 37/12; A47J 43/00; A47J 43/08
[52] U.S. Cl. .............. 99/426; 99/449; 99/450; 211/181.1
[58] Field of Search ............ 99/419, 426, 415–418, 99/448–450; 211/14, 74, 181.1, 182, 184, 189, 85.4, 153; 220/485, 489, 491, 743, 756, 912; 248/175; 294/32, 1.1, 169; D7/409, 360

[56] References Cited

U.S. PATENT DOCUMENTS

| | | |
|---|---|---|
| 158,645 | 5/1875 | Brown. |
| 280,065 | 8/1883 | Pierseinski. |
| 341,513 | 11/1886 | Tiemann. |
| 2,214,137 | 9/1940 | Irwin. |
| 3,566,776 | 3/1971 | Young. |
| 3,665,843 | 5/1972 | Moore. |
| 3,877,109 | 4/1975 | Moncreif. |
| 3,986,445 | 10/1976 | Hooton ........................ 99/450 X |
| 4,027,583 | 6/1977 | Spanek et al. ............... 99/426 X |
| 4,200,040 | 4/1980 | MacRae ........................ 211/181.1 |
| 4,450,759 | 5/1984 | Steibel. |
| 4,458,585 | 7/1984 | Erbach ........................ 99/419 |
| 4,542,684 | 9/1985 | Cantrell ...................... 99/448 X |
| 4,633,773 | 1/1987 | Jay ............................ 99/426 |
| 4,709,626 | 12/1987 | Hamlyn. |
| 4,718,402 | 1/1988 | Fordyce. |
| 4,750,414 | 6/1988 | Dohrs. |
| 4,848,217 | 7/1989 | Koziol ......................... D7/409 |
| 4,854,227 | 8/1989 | Koopman ...................... 211/181.1 |
| 4,924,768 | 5/1990 | Jay. |
| 5,069,117 | 12/1991 | Schlessel. |
| 5,106,642 | 4/1992 | Ciofalo. |
| 5,158,009 | 10/1992 | Stewart ....................... 99/426 |
| 5,203,254 | 4/1993 | Fletcher ....................... 99/449 |
| 5,339,728 | 8/1994 | Marchwiak et al. ........... 99/426 |
| 5,442,999 | 8/1995 | Meister. |
| 5,560,286 | 10/1996 | Fabrikant et al. ............ 99/450 X |
| 5,638,742 | 6/1997 | Kassaseya .................... 99/426 |

*Primary Examiner*—Timothy F. Simone

[57] ABSTRACT

The present invention is a device for roasting a poultry item having a breast portion to be faced downward, first and second leg portions, and first and second wing portions. In one embodiment, the device comprises first and second members each having a first leg portion, a second leg portion and an upper support portion. The first and second leg portions of the first and second member extend downward from and are substantially perpendicular to their corresponding upper support portion. The upper support portion of the first and second member each comprise a wing support portion and a leg support portion. The first and second leg portions of the first member are rotatably connected to the first and second leg portions of the second member, respectively. The first member and second members are moveable from a storage position wherein the upper portions of the first and second members are disposed above each other to a cooking position wherein the upper portions of the first and second members are spaced outward and a substantial distance from each other so that the legs of the poultry item may be placed upon and support by the leg support portions of the first and second members and so that the wings of the poultry item may be placed upon and supported by the wing support portions of the first and second members thereby allowing the breast of the poultry item to be face downward and freely hanging while cooking.

6 Claims, 5 Drawing Sheets

DEVICE FOR ROASTING POULTRY

This is a continuation of application Ser. No. 08/807,333 filed on Feb. 28, 1997 now abandoned.

FIELD OF THE INVENTION

The present invention relates generally to roasting devices. More particularly, the present invention relates to a device for roasting poultry.

BACKGROUND OF THE INVENTION

Poultry such as chickens and turkey have long been a staple article of food. Numerous devices have been developed for cooking poultry. However, such conventional devices only allow the poultry to be cooked with its breast facing upward which results in poultry which may be easily over-cooked and thereby dry tasting. Further, with such conventional devices the poultry does not cook evenly and specifically, such conventional devices cause the breast portion of the poultry to cook faster than the inner thigh or leg portions of the poultry. When cooking times are adjusted to properly cook the breast, the inner thigh or leg portions are left uncooked. Undercooked poultry is a major cause of salmonella poisoning.

The primary object of the present invention is to provide a roasting device which allows a poultry items to be cooked with its breast facing downward and unconstrained. Another object of the present invention is to provide a roasting device which allows the breast, inner thigh and legs portions of the poultry item to be cook evenly.

SUMMARY OF THE PRESENT INVENTION

The present invention is a device for roasting a poultry item having a breast, first and second legs with corresponding thighs, and first and second wings. In one embodiment, the device comprises first and second members each having a first leg portion, a second leg portion, and an upper support portion. The upper support portion of the first and second members each comprise a wing support portion disposed above and outward of a leg support portion. The leg and wing support portions are made from a heat conductive material. The first and second members are rotatably connected and moveable from a storage position to a cooking position wherein the upper portions of the first and second members are spaced outward and a substantial distance from each other. In the cooking position, the device allows the legs and wings to be mounted over the leg support and wing portions of the first and second members, respectively, thereby forcibly separating the legs and wings of the poultry item from its body and allowing the breast of the poultry item to face downward and freely hang during cooking. Separation or stretching of the legs and wings from the body of the poultry item also provides a greater exposed surface area above and below the legs and wings and allows the leg support portion to be in directly contact with the inner thigh portion of the poultry, all of which decrease the time it takes to cook these portions of the poultry item which are difficult to cook. Allowing the breast portion to hang freely during cooking results in the built-up and containment of juices within the breast confined by the outer skin of the poultry item thereby the breast portion to be cooked longer without drying of the breast. Furthermore, the roasting device also acts as a cooking element, fitting under the leg between the thighs and the breast thereby transferring heat to this area of the poultry which is difficult to cook. As such, with the roasting device of the present invention, the leg, wing and breast portions of the poultry item can be evenly cooked at the same temperature and for the same duration. Unlike conventional devices, the wing and legs do not have to be removed and cooked separately from the breast or if not removed, does not result in a poultry item having a perfectly cooked breast portion but under-cooked inner thigh portions or perfectly cooked inner thigh portions and an over-cooked breast portion.

BRIEF DESCRIPTION OF THE DRAWINGS

The following detailed description of the present invention will be more fully understood with reference to the accompanying drawings in which.

DETAILED DESCRIPTION OF THE PREFERRED EMBODIMENTS

Figure 1:
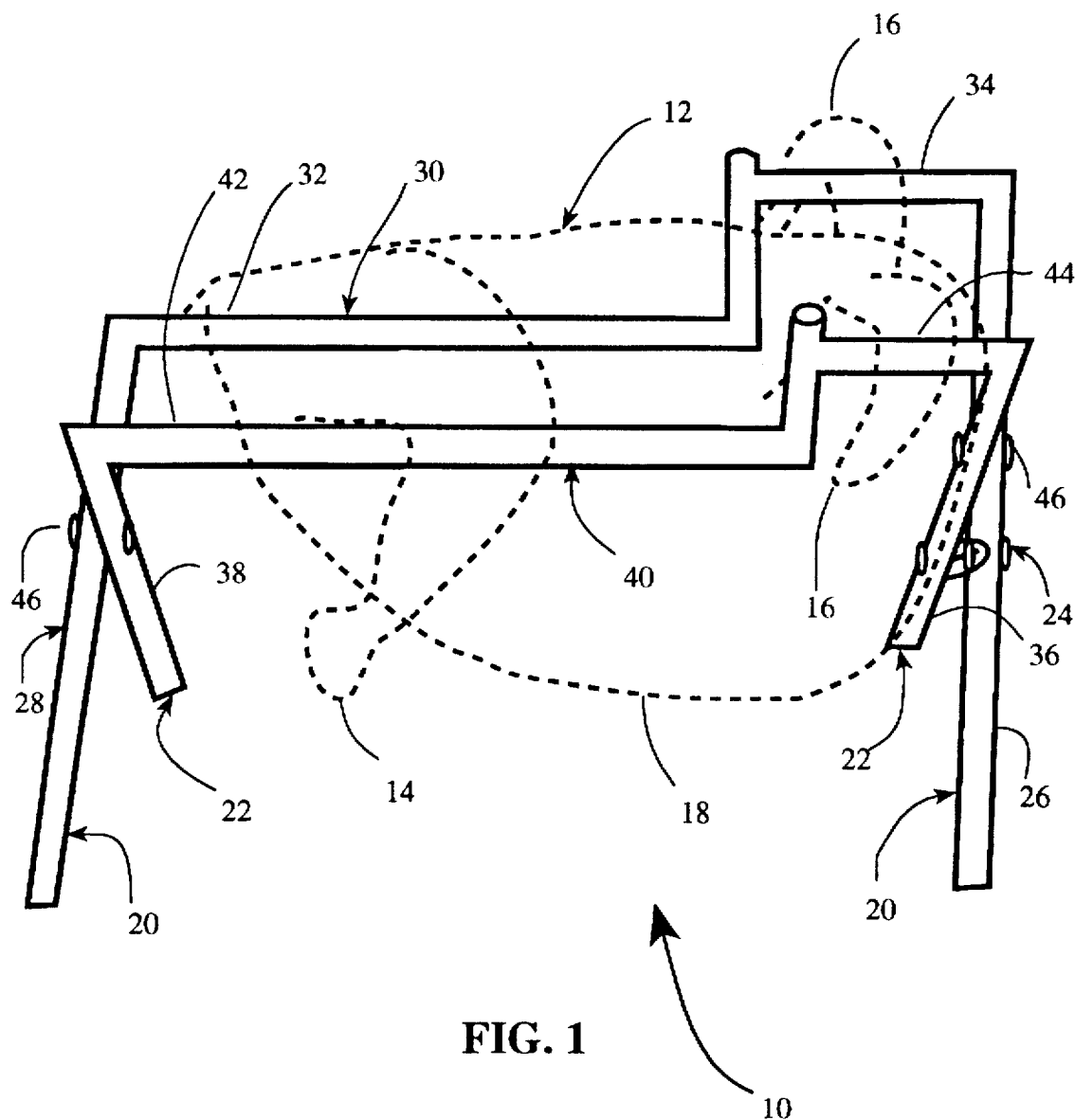
FIGS. 1 and 2 are perspective views a first embodiment of the roasting device of the present invention shown in the cooking position and having a poultry item mounted thereon.
Figure 2:
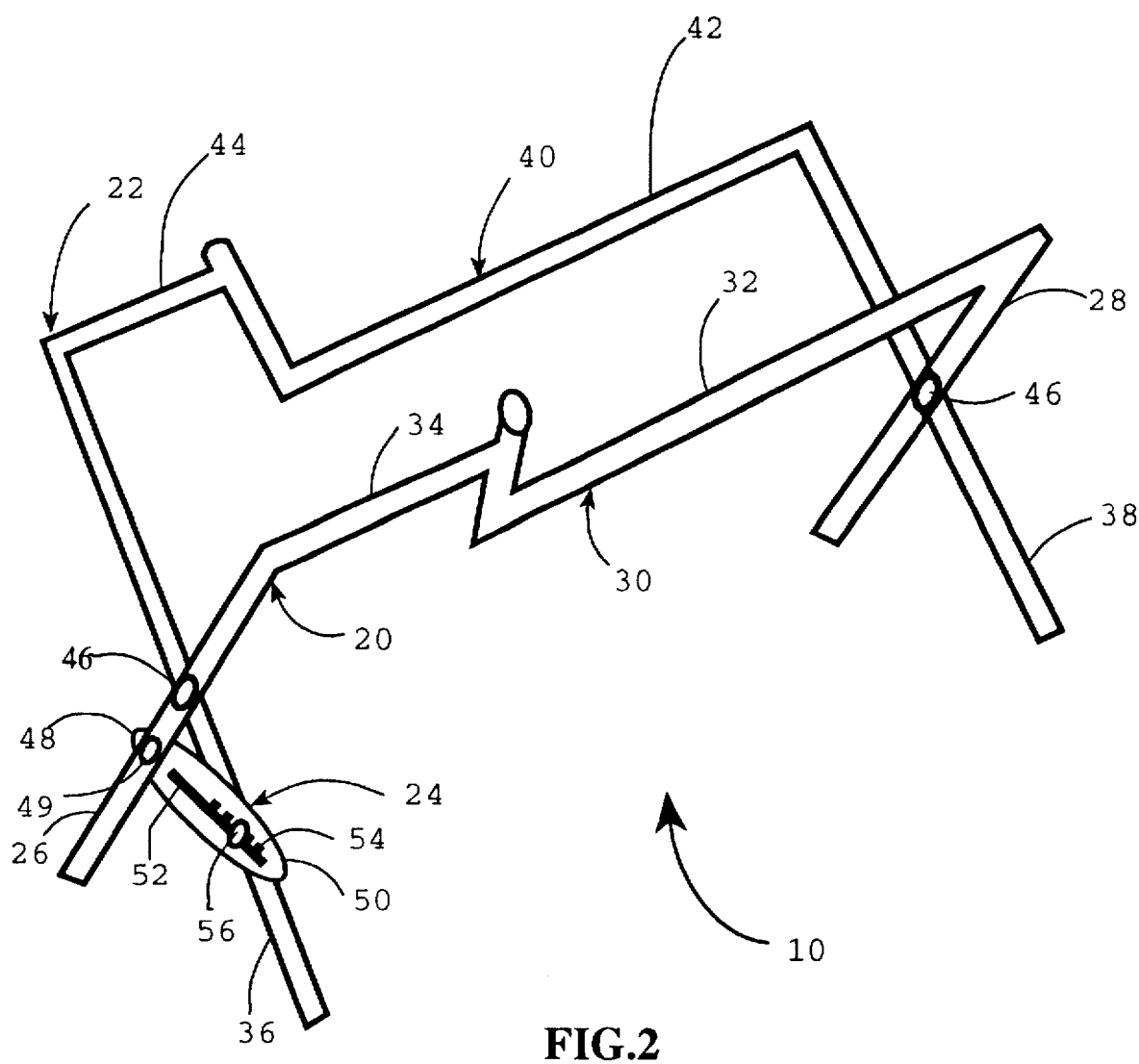
Figure 3:
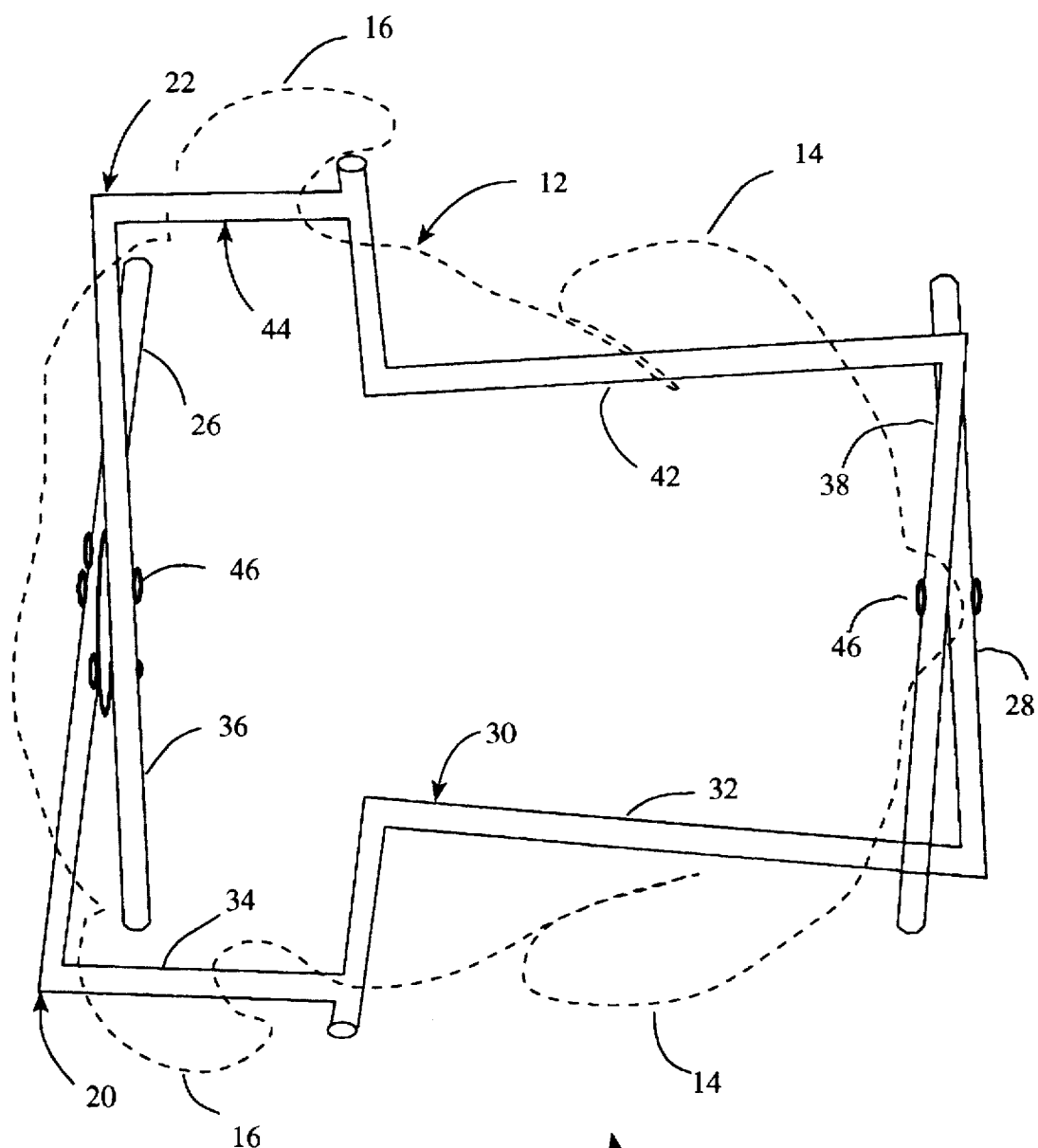
FIG. 3 is a top view of the first embodiment of the present invention shown in the cooking position.
Figure 4:
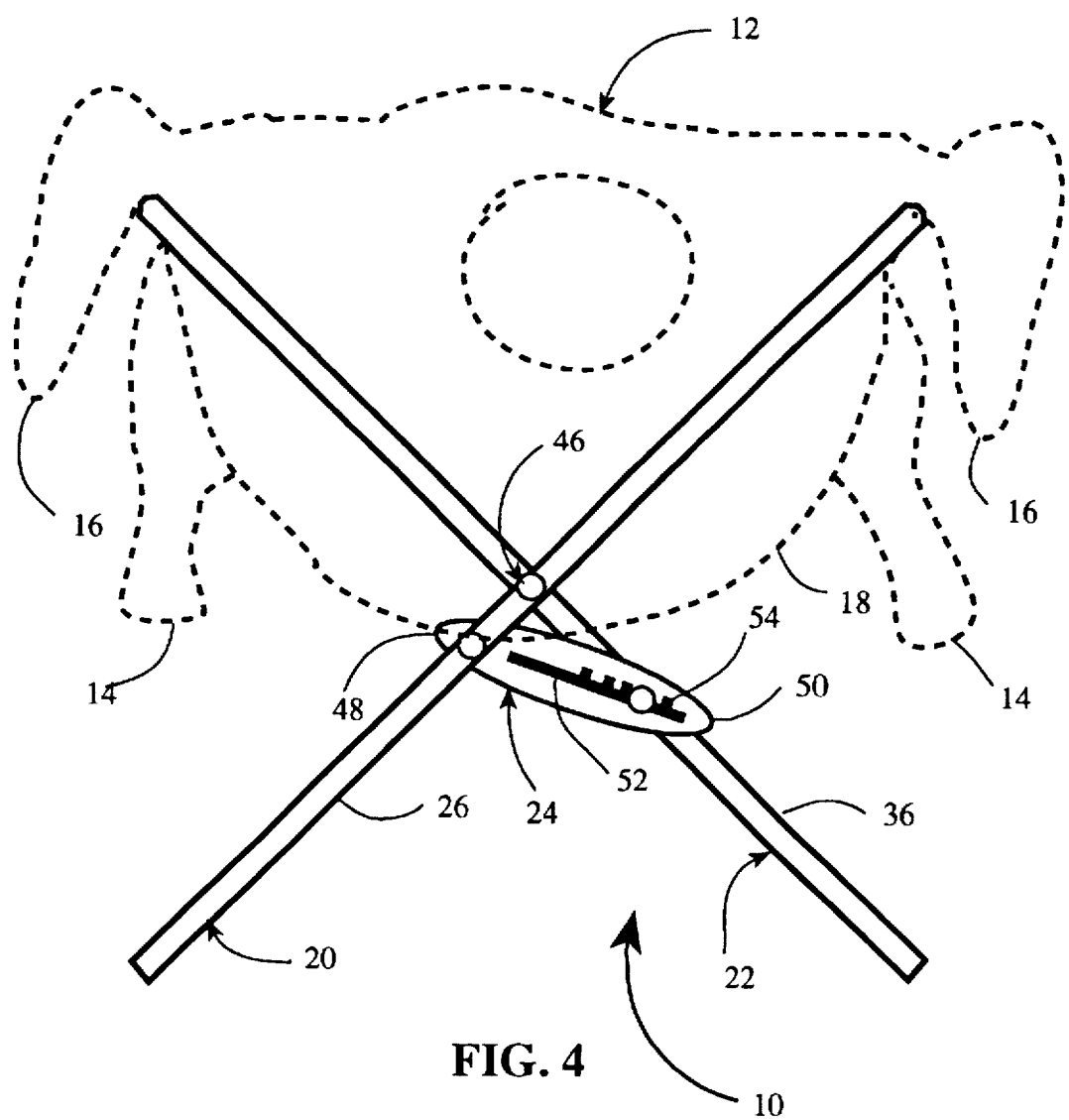
FIG. 4 is an end view of the first embodiment of the present invention shown in the cooking position

Referring to FIGS. 1, 3 and 4, wherein the roasting device 10 is shown in a cooking position having a poultry item 12 mounted thereon. The poultry item 12 has legs 14, wings 16, and a breast 18. When the roasting device 10 is in the cooking position, the poultry item 12 is supported during cooking with its breast 18 facing downward and freely hanging and wherein the legs 14 and wings 16 are separated or stretched outward from the body of the poultry item 12. With the device 10 of the present invention, the wing 16, legs 14 and breast 16 of the poultry item 12 can be evenly cooked and which further results in a significantly moister breast portion after cooking than poultry items cooked by conventional devices wherein the breast is forced to face upwards.

The roasting device 10 generally comprises a first member 20 rotatably connected to a second member 22 from a storage position (FIG. 5) to a variety of cooking positions (FIGS. 1–4). The first member 20 generally comprises a first leg portion 26, a second leg portion 28, and an upper support portion 30. The first leg portion 26 is substantially parallel to the second leg portion 28. The first leg portion 26 and the second leg portion 28 are substantially perpendicular to the upper support portion 30. The upper support portion 30 generally comprises a leg support portion 32 adapted to support the legs 14 and a wing support portion 34 adapted to support the wings 16 which allows the device 10 in the cooking position to separate or stretch the legs 14 and wings 16 from the body of the poultry item 12 which provides a greater exposed surface area above and below the legs 14 and wings 16 thereby decreasing the time it takes to cook these portions of the poultry item 12. Further, the wing support portion 34 is preferably disposed above and/or outward of the leg support portion 32. This allows the legs 14 and the wings 16 of the poultry item 12 to hang or mount over the leg portion 34 and wing support portion 36, respectively, thereby elevating the body of the poultry item 12 such that the neck portion is facing upward rather than downward thereby preventing juices from flowing out of the neck portion during cooking. Alternatively, the leg support portion 32 and the wing support portion 34 may be spaced greater or less from each other. Although less desirable, the leg portion 32 and the wing support portion 34 may have no spacing thereby allowing the leg portions 14 and the wing portions 16 of the poultry item 12 to be facing in either direction. The first member 20 is shown as a unitary member wherein the first leg portion 26, second leg portion 28, and the upper support portion 30 are made and formed from a single piece of material. The first member 20 and thus the first leg portion 26, second leg portion 28 and the upper support portion 30 are preferably of cylindrical shape having an outside diameter of about 0.250 inches and less than 0.500 inches. The outside diameter of the leg support portion 32 and wing support portion 34 (or cross-section width if other shapes are employed) is important so that heat is transferred to the bone areas of the poultry item 12 when the wing portion 16 and leg portion 14 of the poultry item 12 are mounted upon the wing support portion 34 and the leg portion 36 of the first member, respectively. If the outside diameter of the upper support portion 30 is too large, the wing support portion 34 and the leg portion 36 of the first member will not be intimate contact with the wing portion 16 and leg portion 14 of the poultry item 12, respectively. Further, in that the leg portions 14 and wing portions 16 of the poultry item 12 are typically spaced apart from each other, having wing portion 36 disposed outward or above the leg portion 34 allows the wing portion 16 and leg portion 14 of the poultry item 12 to be easily mounted upon and hang over the wing support portion 34 and the leg portion 36 of the first member 20. However, the outside diameter of the upper support portion 30 needs to be large enough to provide adequate structural support.

The second member 22 generally comprises a first leg portion 36, a second leg portion 38, and an upper support portion 40. The first leg portion 36 is substantially parallel to the second leg portion 38. The first leg portion 36 and the second leg portion 38 are substantially perpendicular to the upper support portion 40. The upper support portion 40 generally comprises a leg support portion 42 and wing support portion 44. The wing support portion 44 is disposed above and/or outward of the leg support portion 42. Similar to the first member, this allows the leg portion 14 and the wing portion 16 of the poultry item to be easily supported by and hung over the leg portion 42 and the wing support portion 44, respectively. Alternatively, the leg support portion 42 and the wing support portion 44 may be spaced greater or less from each other. Although less desirable, the leg portion 42 and the wing support portion 44 may have no spacing. The second member 22 is shown as a unitary member wherein the first leg portion 36, second leg portion 38, and the upper support portion 40 are made and formed from a single piece of material. Similar to the first support member 20, the second member 22 and thus the first leg portion 36, second leg portion 38 and the upper support portion 40 are preferably of cylindrical shape having an outside diameter of about 0.250 inches and less than 0.500 inches.

The first leg portion 26 of the first member 20 is rotatably connected to the first leg portion 36 of the second member by a fastener 46. Similarly, the second leg portion 28 of the first member 20 is rotatably connected to the second leg portion 38 of the second member 22 by a fastener 46.

Figure 5:
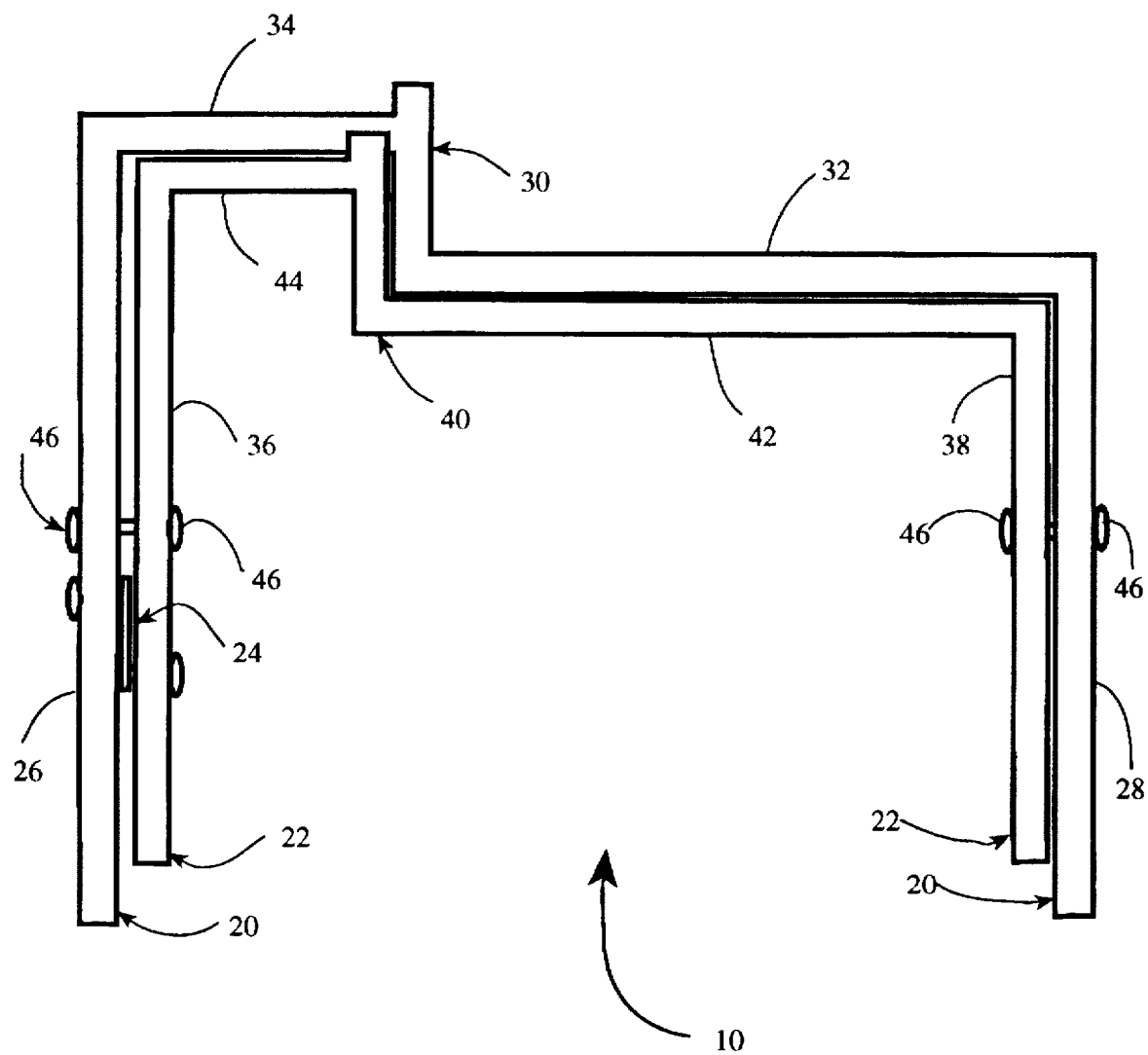
FIG. 5 is a front elevation view showing the roasting device of the first embodiment in the storage position.

The roasting device 10 further comprises an adjustable locking mechanism 24 mounted to each of the first leg portion ends 26 and 36 of the first and second member 20 and 22, respectively, to provide a means of securing the device 10 from a storage position (FIG. 5) to a variety of cooking positions (FIGS. 1–4). The locking mechanism 24 generally comprises a first end 48 rotatably connected by a fastener 49 to the first leg portion 26 of the first member 20 and a second end 50. The locking mechanism 24 further comprises a channel 52 and a plurality of notches 54 in communication with the channel 52. The locking mechanism 24 further comprises a fastener 56 securely connected to the leg portion 28 of the second member 22 and be adapted to slide within the channel 52 and engage with any one of the notches 54. When the fastener 56 is not engaged in any one of the notches 54 and is positioned at the upper most portion of the channel 52, the first and second member 20 and 22 are in the storage position (FIG. 5). When the fastener 56 is engaged in any one of the notches 54, the first and second member 20 and 22 are in a cooking position corresponding to which notch 54 the fastener 56 is located within. When the fastener 56 is engaged in the uppermost notches 54, the first and second members 20 and 22 are in a cooking position wherein the upper support portions 30 and 40 are spaced close to each other whereas when the fastener 56 is engaged in the lowermost notches 54, the first and second members 20 and 22 are in a cooking position wherein the upper support portions 30 and 40 are spaced farther from each other. The preferred location of the fastener 56 within the notch 54 will be dictated by the size of the poultry item 12 to be cooked and in particular, the spacing between each of the leg portions 14 and each of the wing portions 16 of the poultry item 12.

As shown best by FIGS. 1, 3 and 4, when the roasting device 10 is in one of the cooking positions, the leg portions 14 of the poultry item 12 are disposed or hang over the leg portions 32 and 42 of the upper support members 30 and 40, respectively, and the wing portions 16 of the poultry item 12 are disposed or hang over the wing portions 34 and 44 of the upper support members 30 and 40, respectively. When the roasting device 10 is in the cooking position, the poultry item 12 is supported during cooking with its breast 18 facing downward and freely hanging which results in a poultry item which is significantly more moist after cooking than poultry item cooked with its breast facing upward as required by conventional roasting devices. Build-up of juices or other liquids from the cooking process are caused to flow downward and to accumulate in the breast 18 of the poultry item. With conventional devices, the breast 18 of the poultry item 12 is facing upward and any juices resulting from the cooking process are passed through the back of the poultry item 12 and cannot be accumulated within the breast 18.

In the cooking position, the device 10 allows the legs 14 and wings 16 to be mounted over the leg support portions 34 and wing support portions 36 of the first and second members 20 and 22, respectively, thereby forcibly separating the legs 14 and wings 16 from the body of the poultry item 12. Separation or stretching of the legs 14 and wings 16 from the body of the poultry item 12 also provides a greater exposed surface area above and below the legs 14 and wings 16 thereby decreasing the time it takes to cook these portions of the poultry item 12. The device 10 also allows the breast 18 of the poultry item 12 to face downward and freely hang during cooking and to elevate the wings 14 above the legs 16 such that the neck portion is facing upwards rather than downwards. Allowing the breast 18 to hang freely during cooking and elevated such that the neck portion is facing upward rather than downward results in the built-up and containment of juices within the breast 18 confined by the outer skin of the poultry item 12 thereby allowing the breast 18 to be cooked longer without drying of the breast. As such, with the roasting device 10 of the present invention, the legs 14, wing 16 and breast 18 can be evenly cooked at the same temperature and for the same duration. Unlike conventional devices, the wing 16 and legs 14 do not have to be removed and cooked separately from the breast 18 or if not removed, does not result in a poultry item 12 having a perfectly cooked breast 18 but under-cooked legs 14 and wings 16, or perfectly cooked legs 14 and wings 16 and an under-cooked breast 18.

The first and second member 20 and 22 may be made from a variety of materials and from a variety of manufacturing processes. Preferably, the first and second members 20 and 22 are made from a material having a high heat transfer coefficient such as aluminum and which is easy to clean. Although, the first and second members 20 are shown as unitary members wherein the first leg portions 26 and 36, second leg portions 28 and 38, and the upper support portions 30 and 40 are made and formed from a single piece of material, the first and second members 20 and 22 made be made and formed by multiple and separate components and formed in a variety of shapes. By way of example only, the first leg portions 26 and 36 may each be separate members connected by fastener means to the upper support portions 30 and 40, respectively. By way of example only, the first member 20 and thus the first leg portion 26, second leg portion 28 and the upper support portion 30 may of square cross-section rather than cylindrical shape. As such, the foregoing description is intended primarily for purposes of illustration.

This invention may be embodied in other forms or carried out in other ways without departing from the spirit or scope of the invention. Modifications and variations still falling within the spirit or the scope of the invention will be readily apparent to those of skill in the art.

What is claimed is:

1. A device for roasting a poultry item having a breast portion to be faced downward, first and second leg portions with corresponding first and second thigh portions, and first and second wing portions, the device comprises:

(a) a first member having a first leg portion, a second leg portion and an upper support portion, said first and second leg portions of said first support member extending downward from and being substantially perpendicular to said upper support portion of said first member, wherein said upper support portion of said first member comprises a wing support portion and a leg support portion;

(b) a second member having a first leg portion, a second leg portion and an upper support, said first and second leg portions of said second support member extending downward from and being substantially perpendicular to said upper support portion of said second member, said upper support portion of said second member comprises a wing support portion and a leg support portion, said first leg portion of said first support member being moveably connected to said first leg portion of said second support member, said second leg portion of said first support member being moveably connected to said second leg portion of said second support member; and (c) said first member and second members being moveable from a storage position wherein said upper portions of said first and second member are disposed above each other to a cooking position wherein said upper portions of said first and second member are spaced outward and a substantial distance from each other so that the legs of the poultry item may be placed upon and support by said leg support portions of said first and second members and so that the wings of the poultry item may be placed upon and supported by said wing portions of said first and second members thereby allowing the breast of the poultry item to be face downward and freely hanging while cooking.

2. The device of claim 1, wherein said wing support portion of said first member is disposed above said leg support portion of said first member, said wing support portion of said second member being disposed above said leg support portion of said second member.

3. The device of claim 2, wherein said wing support portion of said first member is substantially parallel to said leg support portion of said first member and wherein said wing support portion of said second member is substantially parallel to said leg support portion of said second member.

4. The device of claim 3, wherein each of said first and second members are cylindrically shaped and have an outside diameter.

5. The device of claim 4, wherein said outside diameters of said first and second members is about 0.250 inches.

6. The device of claim 1, wherein said leg support portion is made from a heat conductive material and is adapted to fit under the leg portion of the poultry between the thigh portion and the breast portion thereby transferring heat to this area of the poultry which is difficult to cook.

* * * * *